(12) United States Patent
Miles (10) Patent No.: US 7,652,811 B2
(45) Date of Patent: Jan. 26, 2010

(54) SMALL MECHANICAL OPTICAL SHUTTER WITH NON-IMAGING CONCENTRATING OPTICS

(76) Inventor: Mark W Miles, Bldg. 43, Fort Mason, San Francisco, CA (US) 94123

( * ) Notice: Subject to any disclaimer, the term of this patent is extended or adjusted under 35 U.S.C. 154(b) by 569 days.

(21) Appl. No.: 11/368,958

(22) Filed: Mar. 6, 2006

(65) Prior Publication Data

US 2006/0221426 A1 Oct. 5, 2006

Related U.S. Application Data

(60) Provisional application No. 60/659,498, filed on Mar. 7, 2005.

(51) Int. Cl.
*G02B 26/02* (2006.01)
(52) U.S. Cl. ........................ 359/233; 359/230
(58) Field of Classification Search ................. 359/230, 359/232, 233, 237, 321; 362/239
See application file for complete search history.

(56) References Cited

U.S. PATENT DOCUMENTS

| 7,011,434 | B2 * | 3/2006 | Pate | 362/297 |
| 2006/0245090 | A1 * | 11/2006 | Miles | 359/838 |
| 2008/0112029 | A1 * | 5/2008 | Bodkin | 359/233 |

* cited by examiner

*Primary Examiner*—David N Spector (57) ABSTRACT

In one embodiment, there is provided a method comprising positioning a light concentrating component, having a body comprising a near end and a far end, an exit pupil at the far end, and an internal reflective surface shaped and dimensioned to concentrate light entering the body at the near end to exit the body at the far end via the exit pupil, to a position relative to an modulating component in which position light exiting the body through the exit pupil impinges on an active area of the modulating component; and securing the light concentrating component relative to the modulating component in said position.

17 Claims, 9 Drawing Sheets

SMALL MECHANICAL OPTICAL SHUTTER WITH NON-IMAGING CONCENTRATING OPTICS

CROSS-REFERENCE TO RELATED APPLICATIONS

This application claims the benefit of U.S. Provisional Application No. 60/659,498 filed Mar. 7, 2005.

FIELD OF THE INVENTION

Embodiments of this invention relate to optical devices in general, and to display devices in particular.

BACKGROUND

A variety of mechanically based light modulators have been proposed to date with applications ranging from telecommunications to flat panel displays. In general, such devices can be classified into different categories based on the particular technique used to act on or modulate light. The particular technique used to act on light may include the phenomena of reflection, diffraction, interference, or obstruction. Regardless of the particular technique used to act on light, a light modulator is subject to the design constraint of maximizing its active area, while minimizing the space which must be devoted to an inactive area comprising structural and mechanical components. The active area of a light modulator is that area of the modulator that directly acts on light. Typical components that make up the active area of a light modulator include mirrors, diffraction gratings, liquid crystal cells, and reflective or absorbing charged particles. Examples of the structural and mechanical components that make up the inactive area include hinges, support posts, springs, etc.

The Digital Light Processor (DLP) or Digital Mirror Device, described in various patents including U.S. Pat. No. 5,061,049, exemplifies a class of devices that exploit reflection. In this case directed reflection, i.e. a light beam is either directed towards a viewer via intervening optics, or away. The DLP attempts to maximize its active area by hiding its structural components underneath a mirror that acts as the modulating surface.

Devices which rely on diffraction, such as the Grating Light Valve described in U.S. Pat. No. 6,088,102, maximize active area by shrinking the size of the inactive structural components and using imaging optics to focus light onto the active area.

In interference based devices, such as the interferometer modulator illustrated in U.S. Pat. No. 5,835,255, attempts are made to minimize the inactive area devoted to structural components. Because interference based devices are large area direct view displays there are no focusing optics through which the viewer sees the display. In this case, the active area is such a large fraction of the device that the structural components have minimal effect on the overall performance of the display.

Modulators that rely on obstruction, for example shutters, can be designed to maximize active area as exemplified by the modulator of U.S. Pat. No. 5,078,479. This modulator, like the aforementioned interferometer modulator, exploits the relatively large size of the direct view pixels to its advantage. However, other designs of modulators that have superior mechanical attributes, for example the modulator described and illustrated in U.S. Pat. No. 6,775,048, are not inherently capable of maximizing active area. The modulator of U.S. Pat. No. 6,775,048 incorporates imaging optics that magnifies the pixel active area and allow for its projection onto a viewing screen. However, the optics does not allow the pixel array to be observed from more than one viewing angle, without the viewing screen.

SUMMARY OF THE INVENTION

According to one aspect of the invention, there is provided a method, comprising:
positioning a light concentrating component, having a body comprising a near end and a far end, an exit pupil at the far end, and an internal reflective surface shaped and dimensioned to concentrate light entering the body at the near end to exit the body at the far end via the exit pupil, to a position relative to a modulating component in which position, light exiting the body through the exit pupil impinges on an active area of the modulating component; and
securing the light concentrating component relative to the modulating component in said position.

BRIEF DESCRIPTION OF THE DRAWINGS

FIGS. 3A and 3B of the drawings shows an example of a lateral actuating comb drive with aperture and a latching mechanism, in accordance with the embodiment of the invention. FIG. 3A reveals a top view, and FIG. 3B reveals a side view.

DETAILED DESCRIPTION

In the following description, for purposes of explanation, numerous specific details are set forth in order to provide a thorough understanding of the invention. It will be apparent, however, to one skilled in the art that the invention can be practiced without these specific details.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present invention discloses, in one embodiment, a microfabricated dynamic device in the form of a movable shutter, whose functionality as an optical modulator is enhanced by being physically and optically coupled to a static optical light concentrating component in the form of a non-imaging concentrator (NIC). The NIC acts as both a light concentrator, directing light to the selected areas of the shutter, and a mask, which conceals the non-optical components of the shutter.

Figure 1:
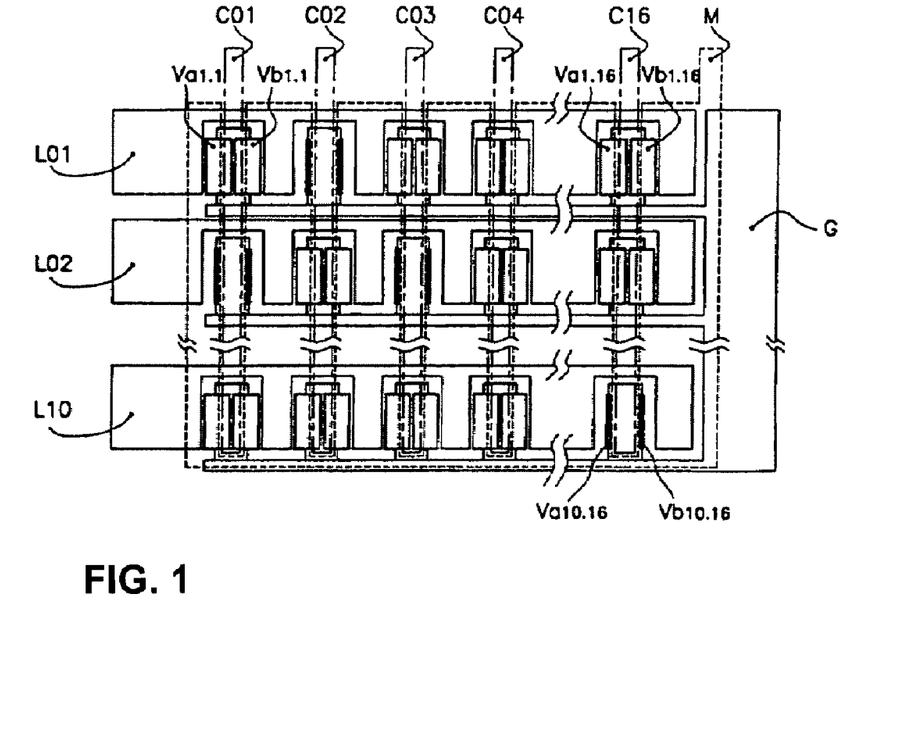
FIG. 1 of the drawings show us a prior art example of a micro-mechanical shutter device for direct view display devices.

Although a movable shutter will be described as the dynamic component of the present invention, it is to be understood that the movable shutter is representative of a modulating component which includes any mechanical, or otherwise light altering structure which can modulate light, Referring now to FIG. 1 of the drawings, prior art describing a micromechanical shutter based display is shown. The efficiency of this device is limited by the ability to maximize active area, and to minimize the amount of device area devoted to non-actuating components. This device is optimized for direct view applications.

Figure 2:
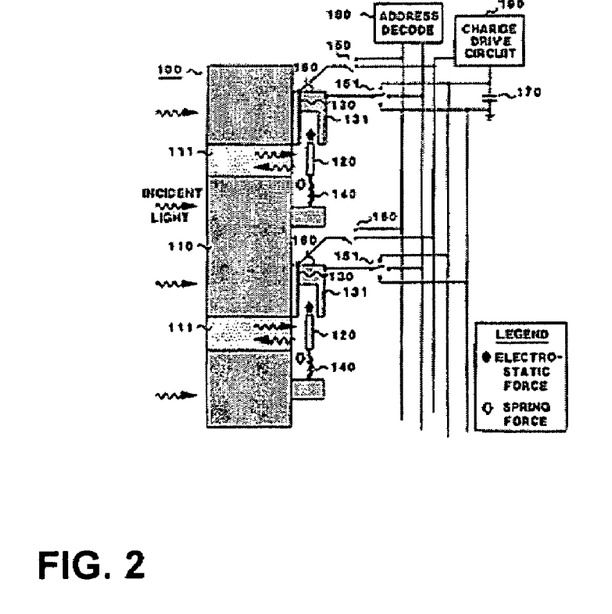
FIG. 2 of the drawings shows a prior art example of a micro-mechanical shutter for a projection display device.

Referring to FIG. 2 of the drawings, prior art describing a micromechanical shutter optimized for projection displays is shown. Light which is directed towards one side of the device is selectively transmitted to the other side. Light losses in this device are significant because of the amount of area, again, devoted to non-actuating components.

Figure 3A:
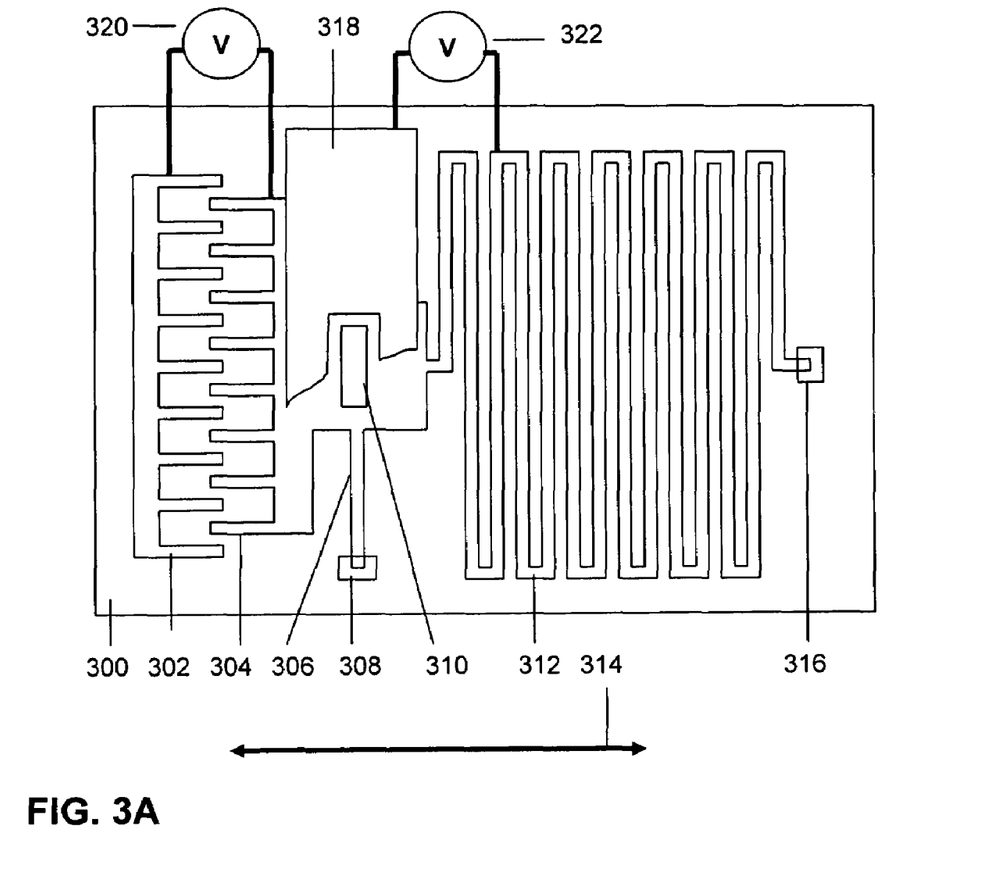
Figure 3B:
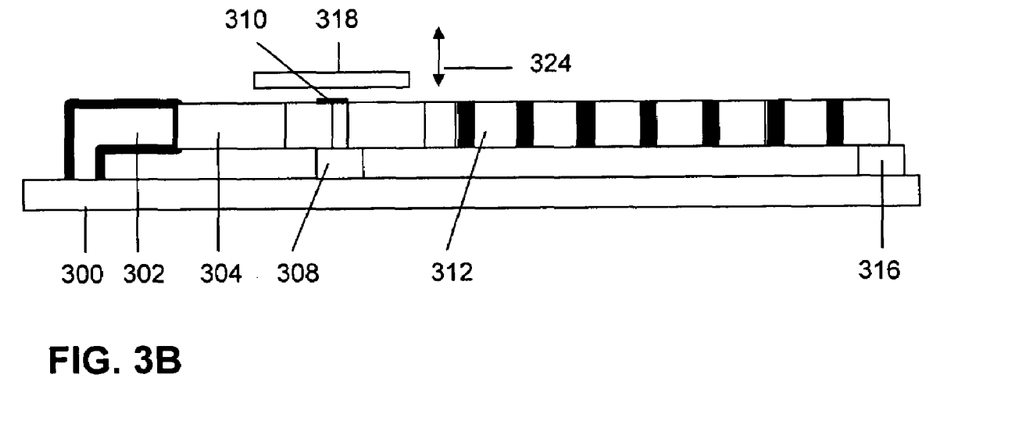

An alternative structure is illustrated in FIGS. 3A and 3B, in which a top and a side view, respectively of a laterally actuating comb drive with shutter can be seen. The laterally actuating comb drive may be incorporated into a comb drive resonator. Substrate 300 is of glass, but may be of different materials in other embodiments. A substrate 300 forms a base upon which the structure is fabricated. Stator 302, is securely attached to the substrate, and comprises an array of interdigitated electrodes whose dimensions and location complement those of rotor 304. Rotor 304 is a single piece divided into several components that comprise shutter 310, flexible support arm 306, support arm anchor 308, spring 312, and spring anchor 316. Anchors 308 and 316 are the only portions of the rotor that are secured to the substrate, the rest are free to move. Both rotor and stator are nominally made from the same materials that include but are not limited to conducting materials such as metals or metallic allows which may be easily deposited and patterned. For most applications, it is desirable for this material to be highly reflective, or coated to achieve such reflectivity, particularly in the region surrounding the shutter in an area adjacent to and at least as large as the shutter. In general, fabrication can be accomplished using the tools and techniques well known in the art of surface micro-machining, including but not limited to, plating, deposition, lithography, and etching.

Typical X and Y dimensions for the device defined approximately by the boundaries of the substrate as shown, range from tens to hundreds of microns. The shutter size is dictated to a large extent by the range of motion of the rotor but and also by size constraints of the NIC. The materials of the structure are chosen so that the rotor is capable of motion in the direction indicated by arrow 314. A spring 312 exerts a mechanical restoring force on the rotor. This mechanical restoring force is dictated primarily by the dimensions and properties of spring 312, and to some extent by the dimensions and properties of support arm 306. Regarding the dimensions of spring 312, the lateral width of one arm of the spring, should be as small as possible to minimize the spring constant. In one embodiment, the lateral width may be in a range from one tenth of a micron to several microns. Thickness of the structure should generally be at least some multiple of the width of the spring, though possibly as thick as several hundred microns.

Application of positioning voltage 320, between the rotor and stator results in the generation of electrostatic forces between the digits of the rotor and stator, which are also referred to as combs, thus the name comb drive. Application of sufficient voltage can result in movement of the rotor laterally according to well known equations. Due to the lateral movement of the rotor, the lateral position of the shutter 310 may be positioned with a high degree of control within the stable electromechanical limits of the device. With dimensions approximating those suggested above, this device should be capable of actuation times in the hundreds of microseconds, actuation ranges of up to 10 microns, and actuation voltages less than 20 volts.

Application of latch voltage 322, between the rotor 304, and latch electrode 318 can also result in the generation of electrostatic forces between those two components. Application of a sufficient voltage can produce motion in the rotor in the direction indicated by arrow 324. This motion is governed by similar equations to the one described above and similar physical and dimensional factors apply. If enough voltage 322, is applied, physical contact may occur between the latch electrode and the rotor. The net result is that a mechanism exists to secure the lateral position of the rotor via the friction that occurs between the two components upon contact. After the desired position is achieved with the application of positioning voltage 320, the latch voltage 322 is applied, and the positioning voltage may be turned off, or brought to a different value without affecting the rotor and consequently the shutter's position. It should be noted that the latch electrode is patterned in such a way so as to not optically obstruct the shutter in its quiescent position. Additionally, the latch electrode may include a suitably insulating surface coating or preparation in order to prevent shorting during latching.

Imaging optics, which occur in forms such as lenses and mirrors, are generally designed with the goal of forming an image. Non-imaging optics are optical components that are designed without image formation as the primary goal. The overarching goal is the controlled transfer of radiation from one location to another. One consequence is that the designer has more degrees of freedom within which to work, and optics with the potential for extreme efficiencies not attainable with conventional imaging optics.

Figure 4:
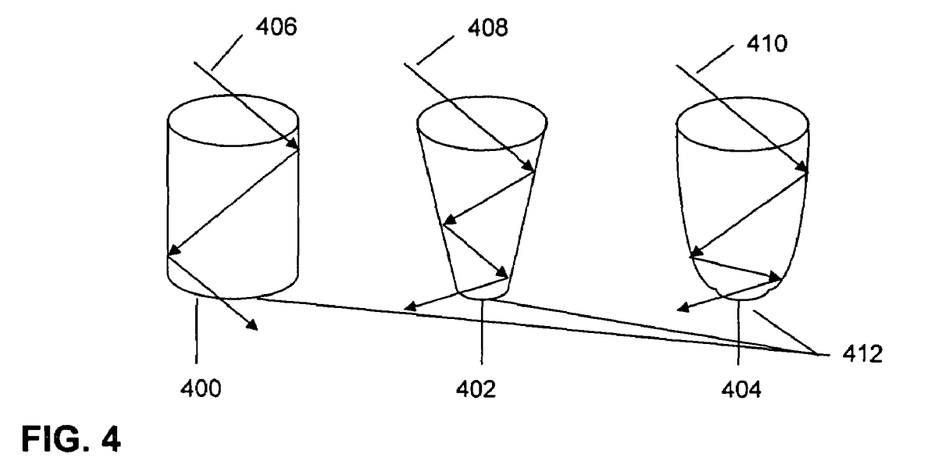
FIG. 4 of the drawings illustrates two kinds of non-imaging optics, one concentrating and one non-concentrating.

Referring to FIG. 4 of the drawings, two types of non-imaging optics are illustrated. Optic 400 is a cylindrical component which could occur in the form of a fiber optic, (a light pipe), or a hollow polished metal cylinder. From a functional standpoint, light rays 406, which enter this optic exit the optic, at exit pupil 412, at fundamentally the same angle with varying amounts of loss depending on the nature of the internally reflecting surfaces. Since the optic is uniform in size over its length, the luminance of the light does not change from input to output. Optics 402 and 404, are examples of light concentrating components, which are also referred to as non-imaging optics, herein. Depending on the geometry of the structure, light 408 and 410 entering the system, can emerge with higher luminance over a smaller exit area. Among other features, if designed properly these components can capture and transfer light from an extremely broad range of input angles. Optic 402 is a conical or tapered structure, while optic 404 derives from the family known as compound parabolic concentrators.

Figure 5:
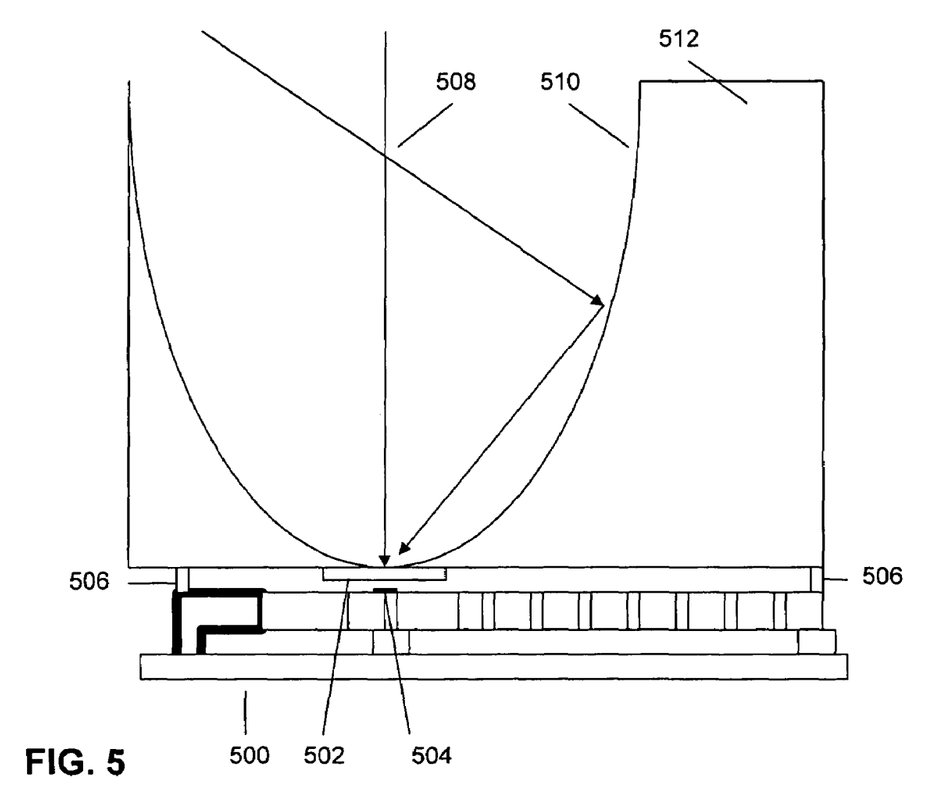
FIG. 5 of the drawings shows a lateral actuating mechanical shutter coupled with a concentrating non-imaging optic, in accordance with one embodiment of the invention FIG. 6 of the drawings shows a mechanical shutter and concentrating non-imaging optic, in accordance with one embodiment of the invention, in a reflective mode.

Referring to FIG. 5 of the drawings, a side view is shown of the comb drive with shutter (CDWS) of FIG. 3B, which has been structurally coupled and optically aligned with a NIC of the compound parabolic reflecting type. Supports 506 provide the structural bond between the two. Latch electrode 502, is deposited and patterned on the exit surface of NIC 512, in such a way as to not obstruct the exit pupil of the NIC. CDWS 500 is aligned so that its shutter 504, is aligned with the exit pupil of the NIC in the quiescent state. The NIC may be made of a variety of materials including but not limited to injection or micro-molded plastics with a suitable internal reflective coating 510, deposited on the inner surface. Dimensions of the NIC are driven by the dimensions of the underlying CDWS, though in general the vertical height should be at least several times that of the width of the CDWS, possibly several hundred microns to as much as 1 mm. The entry pupil should be maximized to achieve the greatest fill factor, while the exit pupil must correspond to the range of motion afforded by the CDWS's design. Perhaps 5 to 10 microns. The reflective coating may be of many highly reflective materials like metals such as aluminum or silver. Certain designs may also take advantage of total internal reflection providing for nearly lossless behavior. Proper design of the NIC allows the broadest range of incoming light rays 508, to be directed towards the shutter 504. For purposes of this document, the combination of these components will be referred to as a subpixel.

Figure 6A:
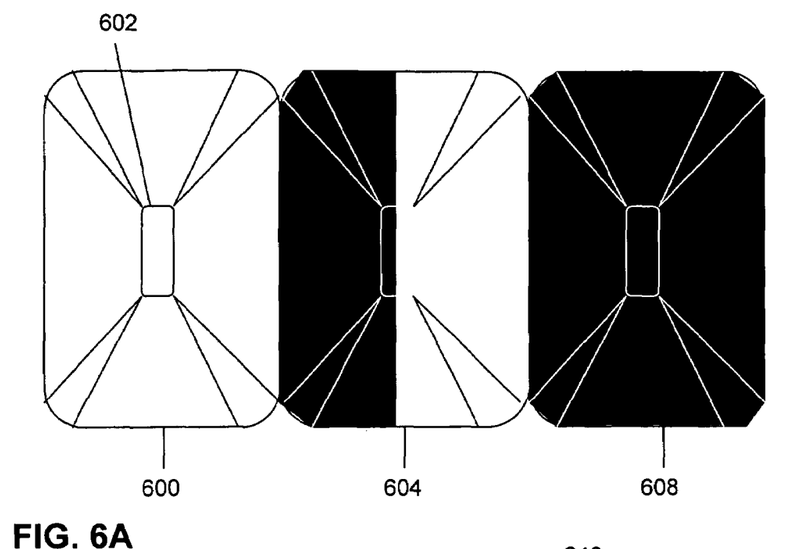
Figure 6B:
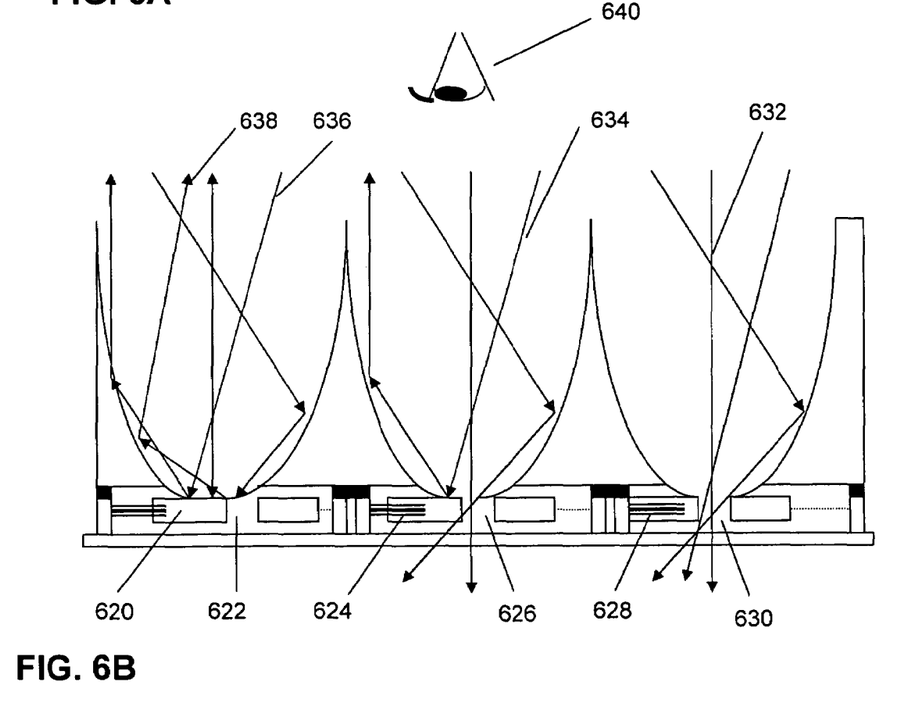

Referring to FIG. 6, three subpixels are shown forming a pixel in three states of actuation. FIG. 6A shows a top view of the pixel from the perspective of viewer 640, and FIG. 6B reveals the corresponding side view. The pixel is shown operating in reflective mode, that is to say varying amounts of incident light 632, 634, 636, are reflected to the viewer based on the states of the individual shutter. The CDWS of 608/630 has been actuated so that the exit pupil of the associated NIC is completely unobstructed. The light exits through the system and propagates away and either dissipates or is attenuated by an absorbing component that is not shown here. The consequence is that this subpixel appears dark to viewer 640. CDWS 604/626 is shown actuated so that its shutter obstructs half of the optical path, therefore transmitting approximately half the light while reflecting the remainder from reflecting shutter 624. Finally, CDWS 600/620 is positioned so that all of the light is reflected back the viewer from reflecting shutter 620.

As a reflective light modulator this subpixel has a variety of attractive characteristics. Because the NIC is concentrating and changes dimensionally over its length, the exit light may be directed to a smaller area than the incoming. Thus, the mechanical components of the CDWS may be designed without regard for their bearing on the overall optics of the subpixel since they are inherently hidden from view. This characteristic also allows exceptionally high fill factors to be achieved. Appropriate design of the NIC can maximize the amount of light collecting area, as seen in FIG. 6A, to values as high as 95% or more. The fact that the CDWS can be arbitrarily positioned enables the generation of analog reflectivity values (gray scale) whose resolution and accuracy are determined by the capabilities of suitable driver electronics. State of the art driver ICs are capable of up to 256 output voltage levels. Finally, and of great significance, is the fact that this shutter has the potential to be an extremely efficient modulator. Because the incident light only interacts with highly reflective metal surfaces such as silver films which can exceed 98%. Losses are therefore determined by the number of reflections the incident light experiences, which under certain circumstances (center aligned rays with perpendicular incidence) is only one. Proper design of the NIC can probably limit this number to five or six, maintaining overall reflectivity in excess of 90%. By comparison, typical reflective LCDs are capable of 15% reflectivity albeit with the addition of some loss adding optical components. Furthermore, this subpixel does not exhibit any changes in optical behavior as the angle of incidence is altered, an issue which LCDs must contend with Referring to FIG. 7, a transmissive mode version of the shutter is illustrated also in the format of a three component pixel. In this case, illumination source 700, is used to direct incident light 702, into the NICs of pixel 704. The illumination source may be one of many different components used in the art to supply uniform two-dimensional light fields which can include, but are not limited to, electroluminescent panels, LED or CCFL driven optical backplates, or arrays of fluorescent tubes with intervening diffuser layers and structures.

Figure 7:
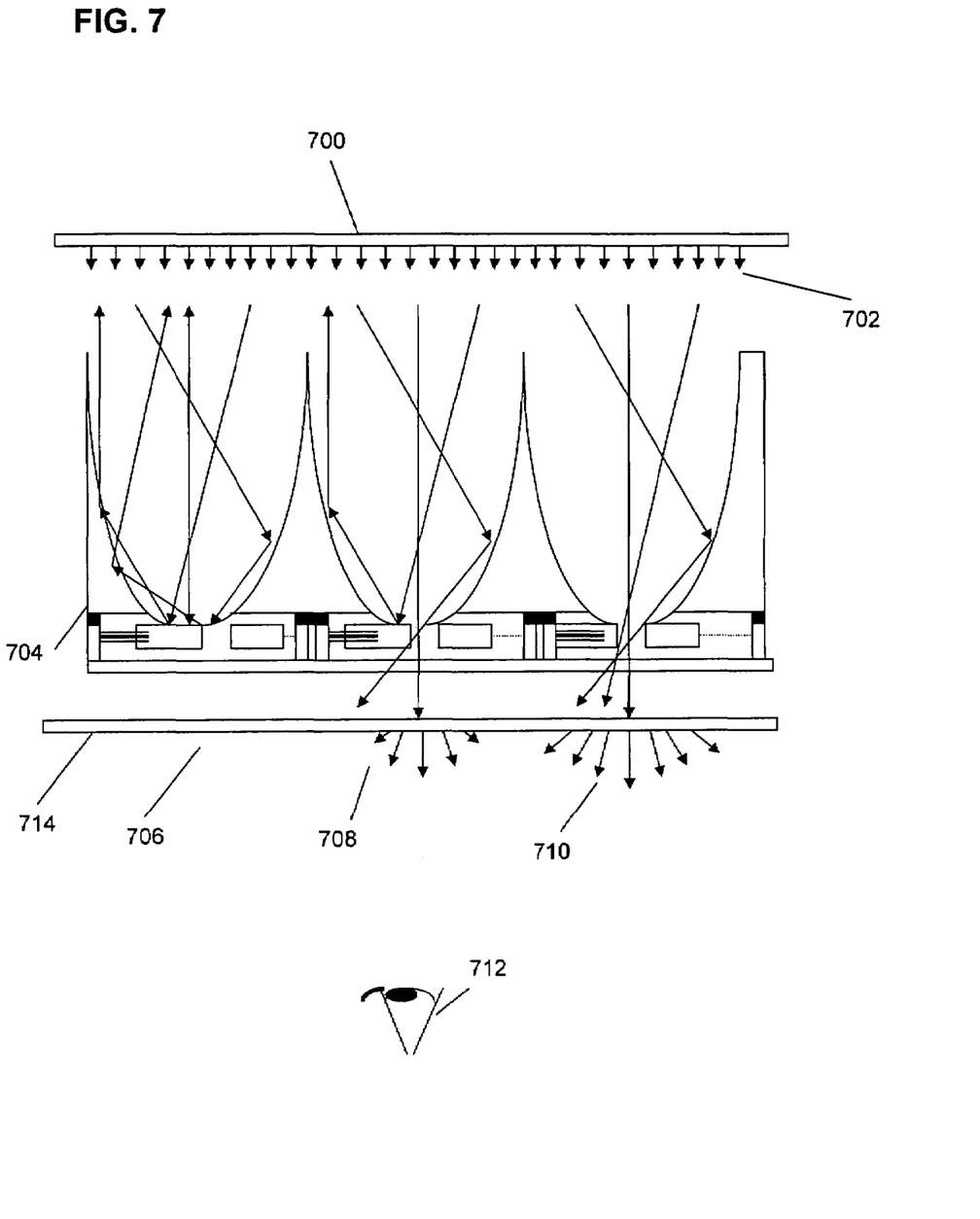
FIG. 7 of the drawings illustrates a mechanical shutter and concentrating non-imaging optic, in accordance with one embodiment of convention, in a transmissive mode.

From a functional standpoint this device acts in a fashion opposite that of the reflective pixel in FIG. 6. In this case, when the optical path is not obstructed as sub-pixel 710 is, the maximum amount of light is transmitted to viewer 712. Shutter 706 is shown at the opposite extreme, with the CDWS positioned for maximum obstruction, totally eliminating transmission. Diffuser film 714, serves to eliminate the pinpoint light source effect that might occur and be undesirable in certain applications.

One advantage that this approach has over say LCDs, is the fact that absolutely no transmission occurs when the sub-pixels are in the dark state. In an LCD there is always some degree of transmission in the dark state, which compromises the overall contrast ratio. A further advantage of this approach is the light gathering efficiency. In an LCD, light transmission through entire optical system rarely exceeds 6%. Even with the addition of peripheral optical components transmission should exceed 25% in a CDWS based pixel.

Figure 8:
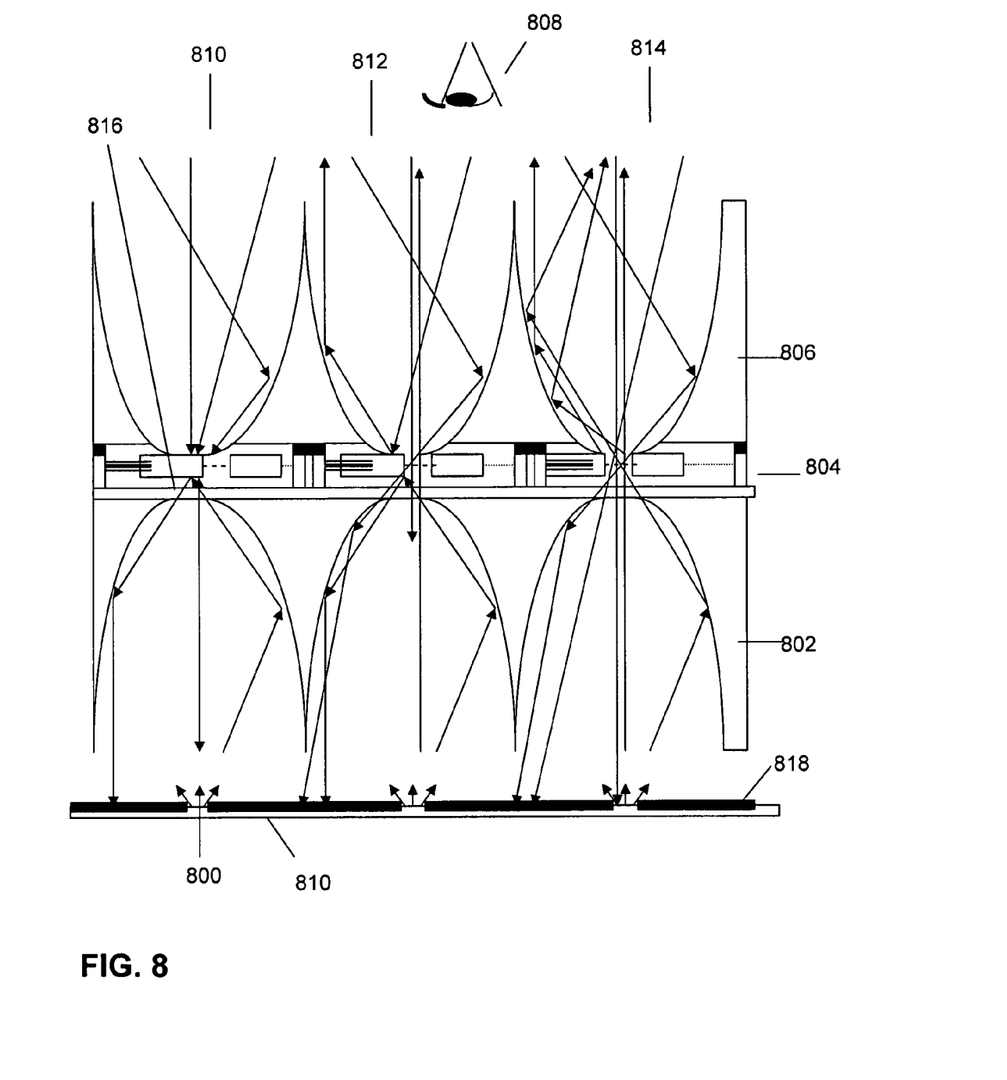
FIG. 8 of the drawings shows a mechanical shutter and concentrating non-imaging optic, in accordance with one embodiment of the invention, in a transflective mode.

Referring to FIG. 8, a transflective mode version of the shutter is illustrated also in the format of a 3 component pixel. Viewer 808 gazes onto an array of NICs 806, which have been bonded two a CDWS array 804, and subsequently bonded to NICs 802. NIC 802 is not absolutely essential, but it does increase the collection efficiency of the incoming light. On the opposite side of this sandwich, (from the viewer's perspective) resides patterned light source 810, which comprises an array of point illumination sources 800, which are interspersed by light absorbing (or transmitting) regions 818.

Figure 9:
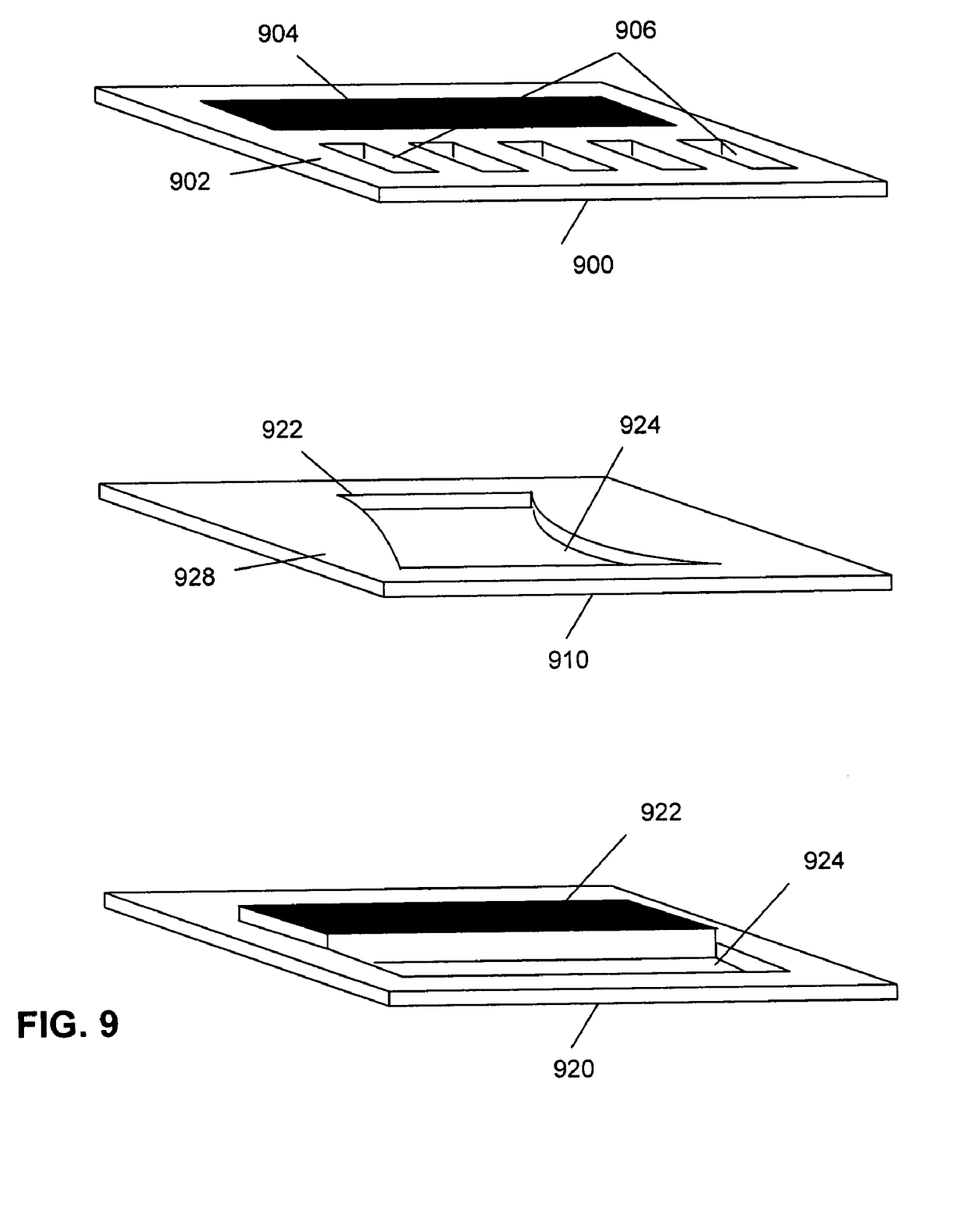
FIG. 9 of the drawings shows a shutter configured for transflective operation, having a non-rectangular aperture, and incorporating color and/or diffusing elements, in accordance with one embodiment of the invention.

Key to the operation of the CDWS of FIG. 8 is a modification of the shutter. Referring to FIG. 9, this revised shutter 900, comprises an array of clear slots 906, the aperture, which allow for light transmission. The frame 902, is a reflective material or metal. Adjacent to the slotted region is a light absorbing area 904, which may be achieved by depositing a patterning a variety of films including black chrome, organic dyes, or interferometric thin film stacks. These two regions are positioned on the shutter of the CDWS such that at one extreme of actuation the optical path aligns with the slotted region 906, and at the other extreme with absorbing region 904. This corresponds to the states of shutters 814 and 810, respectively.

Referring again to FIG. 8, in the case of sub-pixel 812, some of the light that is incident from the viewer's side is transmitted at the slotted portion of the shutter and some is reflected. In a similar fashion, some of the light that is incident from the illuminator is transmitted to the viewer and the rest is reflected. In this fashion, the viewer sees light that is both reflected and transmitted thus a transreflective mode of operation is achieved. Shutter 810 transmits and reflects no light, as all (or most) of the incident light from the viewer side is attenuated by absorbing region adjacent the slotted aperture, now in the optical path in this state. Correspondingly, no light from the illumination source is transmitted to the viewer.

While this mode is not as efficient optically as either the reflective or transmissive modes, its still compares well with LCD based solutions. It also affords an option for supplying light to the device when ambient conditions are unacceptably dark for pure reflective functioning.

Further referring to FIG. 9, shutter 910 is shown with a non-rectangular aperture 924. The consequence of this is that the amount of light reflected, or transmitted, or both, varies in a non-linear fashion as the shutter is actuated. This provides a means for compensating for non-linear modes of actuation for a comb-drive. While there are ways of accomplishing this within the structure of the comb-drive itself, supplementary or alternative means may be achieved by the proper selection of the geometry of the aperture.

Again referring to FIG. 9, shutter 920 is shown with colored region 922 adjacent to clear aperture 924. Colored region 922 may be of a material which as an inherent color for example cyan, magenta, or yellow. This material may be in the form of a patterned organic color filter material, or inorganic films, or a periodic structure. Thus, with the colored region positioned to align with the aperture, all of the incident light is subject to effect of the colored region. The intensity of this effect is reduced zero as the shutter is actuated such that all incident light propagates through the slot. The colored region may also have diffusive properties, or properties of both a diffuser or color filter. Thus, one positioning for the color filter and/or diffuser is illustrated.

Figure 10:
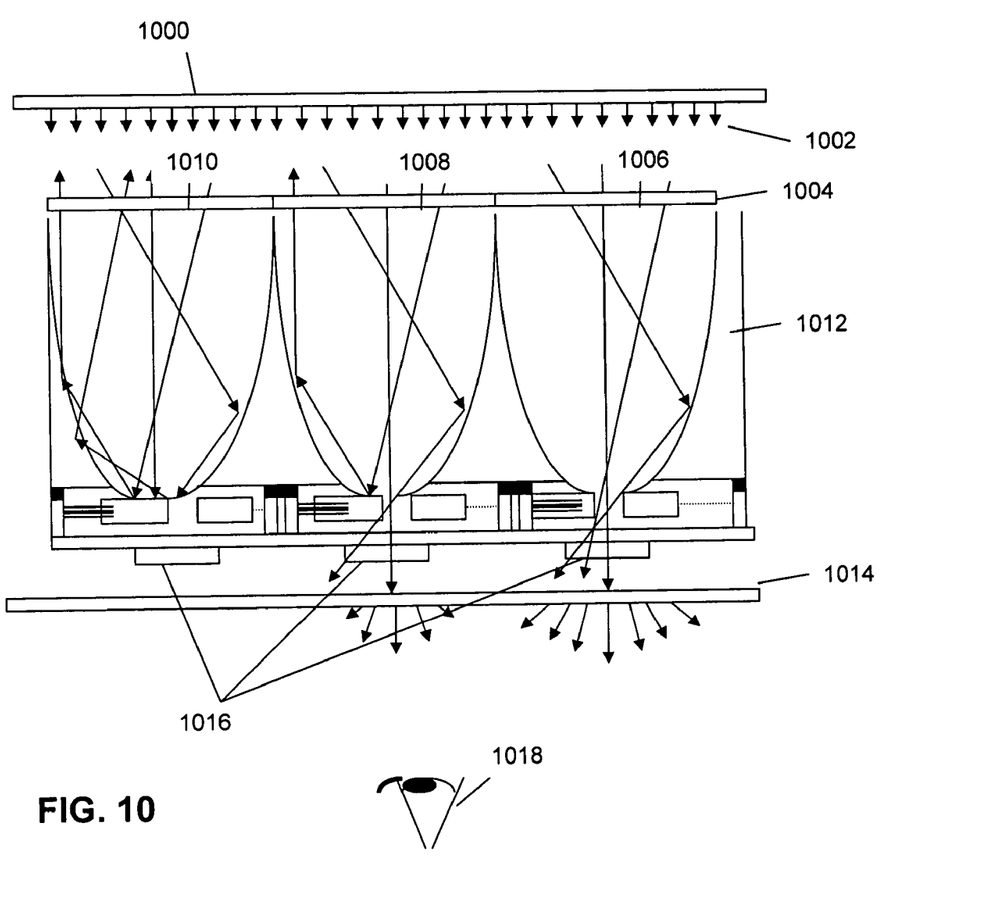
FIG. 10 of the drawings shows a pixel based on a mechanical shutter and concentrating non-imaging optic with color selection film, in accordance with and one embodiment of the invention FIG. 11 of the drawings shows a reflective flat panel display using a mechanical shutter based pixel, in accordance with one embodiment of the invention.

Referring to FIG. 10, another option for achieving color performance in this shutter are shown. The transmissive mode is used as the basis for this description, though it should be noted that reflective and color functionality may be achieved in a similar fashion. Light 1002, is incident upon NIC 1012 through color filter film, 1004, which is broken into three regions 1006, 1008, and 1010 which correspond to red, green, and blue colored regions.

Many options are available for generating the color film ranging from but not limited to photolithographically patterned organic dyes, to printed or liquid-jet deposited arrays of colored inks. Another option is to position color filter regions 1016, at the exit of the optical path. Diffuser film 1014 may also be positioned in a similar fashion (before the NIC, or at the path exit) depending on the needs and merits of a particular design. Because the color filtering components described do not change with angle of incidence, color quality is maintained no matter what angle the viewer perceives the pixel from.

Figure 11:
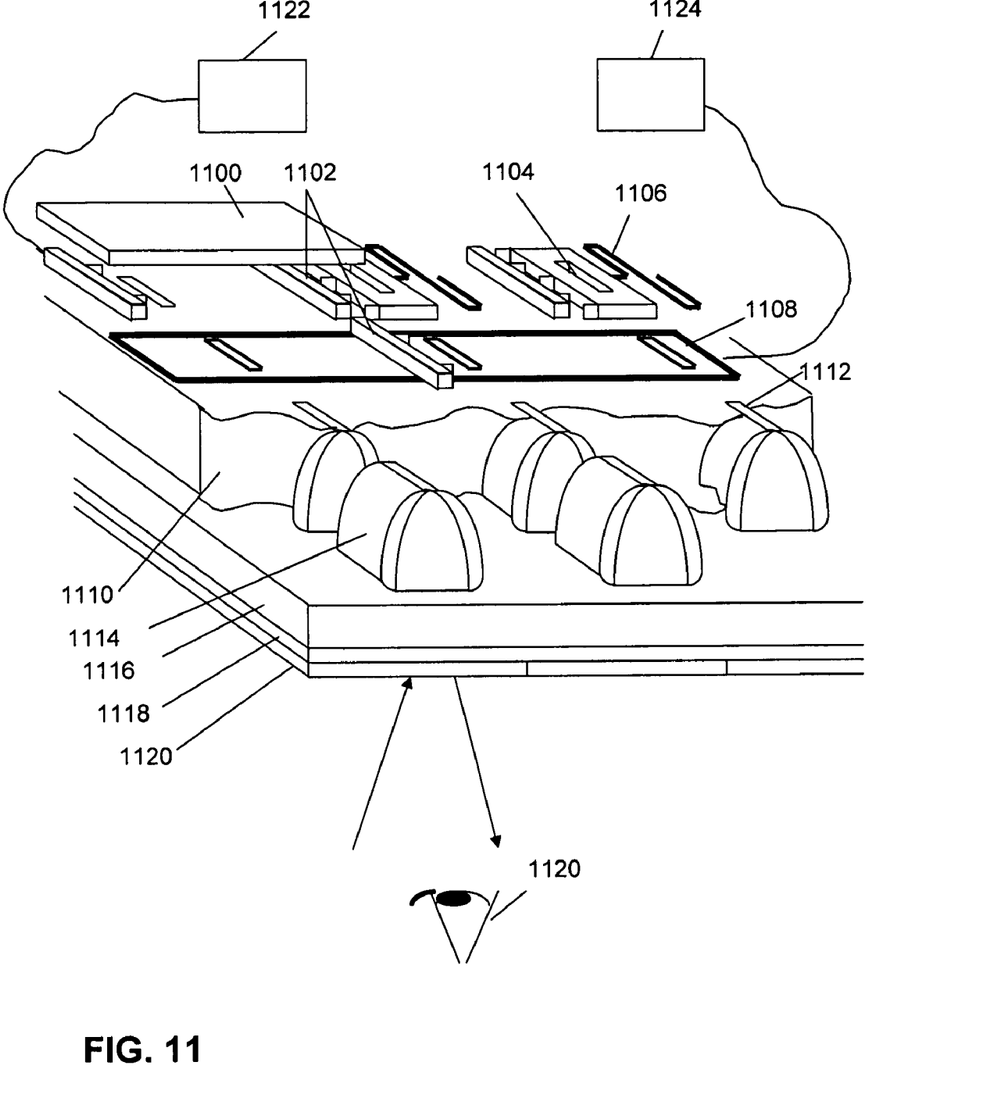

Referring to FIG. 11, a segment of a full-color flat panel display based on shutters is illustrated in cutaway fashion. A portion of substrate 1100, is shown and as indicated earlier may be of a variety of materials such a glass, though various plastics or plastic laminates which may or may not be structured to allow for connections through the substrate are also possible. Stators 1102 and rotor 1104 are shown and would be fabricated upon the substrate. Spring 1106 is revealed as a further detail. Horizontally aligned stators 1102 are electrically connected to form one of an array of linear column electrodes, each of which would have an independent voltage applied during operation. All of the rotors are connected to a common electrode in this configuration. Latch electrode 1108, is shown deposited and patterned on the exit surface of NIC layer 1110, and is one of multiple row electrodes arranged vertically. Exit pupil 1112, is shown as one element in an array which is appropriately aligned with the array of CDWS array. The combination of each forming a single pixel or sub-pixel. Detail of the NIC 1114, is revealed further into the cutaway. Substrate 1100 is bonded to NIC layer 1110, Substrate 1100 is bonded to NIC layer 1110, with the entire assembly bonded to support substrate 1116. This component, also potentially glass or plastic, serves to support diffuser film 1118, and color filter array 1120. Column driver 1122, and row driver 1124, are connected to stator columns and latch electrode rows respectively.

The need for a latching function now becomes apparent. This capability is important in that it allows two-dimensional arrays of CDWSs, to be independently addressed. All of the rotors of the pixels are connected and arranged to form multiple column electrodes, and the latches patterned to form row electrodes. The stators are all connected to a common ground. Thus in the classic line-at-a-time fashion, which is well known in the art, a particular row may be "unlatched" with the application of zero voltage, while all others remain latched. The column electrodes may then be energized to position each rotor on that row independently of the other, via the electrostatic force generated between the rotor and its associated stator That row is then re-latched, and subsequent rows or lines are un-latched and addressed in a sequential line-at-a-time way. The brightness of each pixel or sub-pixel is determined by the actuated position of each CDWS, and when the entire array is addressed, a complete image is maintained for as long as a latching voltage is present. With a high quality insulating material on the latch electrode, image maintenance consumes virtually no power. Thus primary power consumption occurs only as the display is being addressed.

In general, the resulting display combines all of the attributes that have been described at various points throughout this specification. These include comparatively high brightness and contrast in transmissive, and reflective modes. Amenability to various schemes for providing supplemental lighting including a wide array of existing backlighting solutions. High speed, low power consumption, and high contrast. Low cost should also result as the overall fabrication relies upon a combination of surface micromachining of simple structures using common materials. Such materials, nickel or nickel alloys for example, may be readily and cheaply deposited using plating techniques. Overall assembly could involve the lamination of the CDWS array with a collection of molded and printed films and plastic sheets comprising the NIC layer, diffuser film, and color filter array among others. The films and sheets being manufactured in extremely high volume processes that require a single master to generate many tens of thousands of parts, or high volume ink-jet or printing like processes.

What is claimed is:
1. A method, comprising:
positioning a light concentrating component, having a body comprising a near end and a far end, an exit pupil at the far end, and an internal reflective surface shaped and dimensioned to concentrate light entering the body at the near end to exit the body at the far end via the exit pupil, to a position relative to a modulating component in which position, light exiting the body through the exit pupil impinges on an active area of the modulating component; and securing the light concentrating component relative to the modulating component in said position; wherein the modulating component comprises a subpixel, an active area of which is defined by a mechanical shutter having an aperture, the shutter being laterally displaceable, by a laterally actuating comb drive, relative to the light concentrating component to change the relative positioning between the exit pupil of the light concentrating component and the aperture of the mechanical shutter.

2. The method of claim 1, wherein the internal reflective surface of the light concentrating component is parabolic.

3. The method of claim 1, wherein the internal reflective surface of the light concentrating component is conical.

4. The method of claim 1, further comprising mounting a color filter to filter light from the active area.

5. The method of claim 1, but the comprising mounting a diffuser to diffuse light from the active area.

6. The method of claim 1, wherein the light concentrating component is a first light concentrating component, the method further comprising positioning and securing a second light concentrating component relative to the modulating component so that opposed surfaces of the active area of the modulating component are sandwiched between and aligned with the exit pupils of the first end a second light concentrating components, respectively.

7. A subpixel, comprising:
an active area including at least one optical component to produce an optical response, said optical component defining a mechanical shutter having an aperture;
an inactive area adjacent the active area, the inactive area including a non-optical components defining a comb drive actuator to open and close the mechanical shutter; and
a light concentrating component having a near end and a far end, and an internal reflective surface between the two ends so that light entering the light concentrating component via an opening at the near end exits the light concentrating component via an exit pupil at the far end, the light concentrating component being positioned relative to the active area so that light exiting the light concentrating component impinges on the active area.

8. The subpixel of claim 7, wherein the light concentrating component obscures the inactive area from a viewer.

9. The subpixel of claim 7, wherein the light concentrating component is a first light concentrating component, the pixel then including a second light concentrating component disposed so that the active area is sandwiched between the first and second light concentrating components and aligned with the exit pupils of the first, and second light concentrating components.

10. The subpixel of claim 7, wherein the displacement mechanism is operable to position the plate in at least 3 different positions relative to be light concentrating component, each of which is between the first position and the second position.

11. A display device, comprising:
an array of pixels, each including at least one optical component and a non-optical component adjacent the at least one optical component; and
a plurality of light concentrating components, each of which is mounted adjacent an associated pixel and is shaped and dimensioned to concentrate light to impinge on the at least one optical component; wherein the at least one optical component comprises a mechanical shutter having an aperture, and the non-optical component comprises a comb drive actuator to cause the shutter to be opened and closed.

12. The display device of claim 11, wherein each light concentrating component obscures the non-optical component of its associated pixel.

13. The display device of claim 11, wherein each light concentrating component comprises a body having a near end and a far end, an internal reflective surface between the two ends, an opening at the near end, and an exit pupil at the far end so that light entering the opening at the near end exits the light concentrating component at the far end.

14. The display device of claim 11, wherein the plurality of light concentrating components is a first plurality of light concentrating components, the display device further comprising a second plurality of light concentrating components, each of which in combination with a light concentrating component of the first plurality defines a pair of light concentrating components disposed so as to sandwich a pixel therebetween, the optical component of the pixel being aligned with the exit pupils of the light concentrating components of the pair.

15. The display device of claim 11, further comprising at least one light source to cause light to enter the light concentrating components of the second plurality.

16. The display device of claim 14, further comprising a color filter.

17. The display device of claim 14, further comprising a diffuser.

* * * * *